(12) United States Patent
Lyu et al.

(10) Patent No.: US 8,330,919 B2
(45) Date of Patent: Dec. 11, 2012

(54) ARRAY SUBSTRATE FOR IN-PLANE SWITCHING MODE LIQUID CRYSTAL DISPLAY DEVICE AND METHOD OF FABRICATING THE SAME

(75) Inventors: Ki-Hyun Lyu, Gwacheon-si (KR); In-Duk Song, Gumi-si (KR); Dae-Hyun Won, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 188 days.

(21) Appl. No.: 12/390,152

(22) Filed: Feb. 20, 2009

(65) Prior Publication Data

US 2009/0225250 A1    Sep. 10, 2009

(30) Foreign Application Priority Data

Feb. 22, 2008    (KR) .................. 10-2008-0016107

(51) Int. Cl.
*G02F 1/1343* (2006.01)
(52) U.S. Cl. ........................................ 349/141
(58) Field of Classification Search .................. None
See application file for complete search history.

(56) References Cited

U.S. PATENT DOCUMENTS

| | | | | | |
|---|---|---|---|---|---|
| 5,907,379 | A | * | 5/1999 | Kim et al. | 349/141 |
| 6,028,653 | A | * | 2/2000 | Nishida | 349/141 |
| 6,069,678 | A | * | 5/2000 | Sakamoto et al. | 349/141 |
| 6,133,977 | A | * | 10/2000 | Lee et al. | 349/141 |
| 6,297,867 | B1 | * | 10/2001 | Miyahara et al. | 349/141 |
| 2005/0078262 | A1 | * | 4/2005 | Ono et al. | 349/141 |
| 2008/0002126 | A1 | * | 1/2008 | Lim et al. | 349/141 |

* cited by examiner

*Primary Examiner* — Thanh-Nhan P Nguyen
(74) *Attorney, Agent, or Firm* — Birch, Stewart, Kolasch & Birch, LLP

(57) ABSTRACT

An array substrate for an in-plane switching mode liquid crystal display device includes: a substrate; a gate line on the substrate; first and second common lines parallel to and spaced apart from the gate line; a data line crossing the gate line to define a pixel region; a thin film transistor connected to the gate line and the data line; a pixel electrode connected to the thin film transistor, the pixel electrode having a plate shape; a plurality of common electrodes connected between the first and second common lines, the plurality of common electrodes overlapping the pixel electrode; and first and second shielding electrodes parallel to the data line, the first and second shielding electrodes spaced apart from each other with respect to the data line.

13 Claims, 10 Drawing Sheets

ARRAY SUBSTRATE FOR IN-PLANE SWITCHING MODE LIQUID CRYSTAL DISPLAY DEVICE AND METHOD OF FABRICATING THE SAME

This application claims the benefit of Korean Patent Application No. 10-2008-0016107, filed in Korea on Feb. 22, 2008, which is hereby incorporated by reference in its entirety.

BACKGROUND OF THE INVENTION

1. Field of the Invention

The present application relates to an array substrate for a liquid crystal display device, and more particularly, to an array substrate for an in-plane switching mode liquid crystal display device and a method of fabricating the array substrate.

2. Discussion of the Related Art

In general, a liquid crystal display (LCD) device uses the optical anisotropy and polarization properties of liquid crystal molecules in a liquid crystal layer to display images. Since the liquid crystal molecules have thin and long shapes, the polarization of light through the liquid crystal molecules varies with the alignment direction of the liquid crystal molecules. Accordingly, the LCD device displays an image by controlling the alignment of the liquid crystal molecules as well as the transmittance of light through the liquid crystal layer due to adjustment of the electric field applied to the liquid crystal layer. Active matrix liquid crystal display (AM-LCD) device where thin film transistors (TFTs) and pixel electrodes are disposed in matrix has been the subject of recent researches because of its superiority in displaying moving images and high contrast ratio.

A twisted nematic (TN) mode LCD device includes upper and lower substrates facing each other and a liquid crystal layer therebetween. A common electrode is formed on the upper substrate, which is referred to as a color filter substrate, and a pixel electrode is formed on the lower substrate, which is referred to as an array substrate. When a voltage is applied to the common electrode and the pixel electrode, a vertical electric field is generated between the common electrode and the pixel electrode, and the liquid crystal layer is driven by the vertical electric field. Although the TN mode LCD device has advantages in transmittance and aperture ratio, the TN mode LCD device has disadvantages in viewing angle.

To solve the above problems, an in-plane switching (IPS) mode LCD device having an excellent property in viewing angle has been suggested.

FIG. 1 is a plan view showing an array substrate for an in-plane switching mode liquid crystal display device according to the related art. In FIG. 1, a gate line 20 and a data line 30 are formed on a substrate 10. The gate line 20 and the data line 30 cross each other to define first and second pixel regions P1 and P2. In addition, a common line 50 parallel to the gate line 20 and first and second common electrodes 81 and 82 connected to the common line 50 are formed on the substrate 10. The first common electrode 81 includes a first common horizontal portion 81a and a plurality of first common vertical portions 81b, and the second common electrode 82 includes a second common horizontal portion 82a and a plurality of second common vertical portions 82b. The first common horizontal portion 81a is connected to the common line 50 through a first common contact hole CMH1 and the plurality of first common vertical portions 81b perpendicularly extend from the first common horizontal portion 81a. Similarly, the second common horizontal portion 82a is connected to the common line 50 through a second common contact hole CMH2 and the plurality of second common vertical portions 82b perpendicularly extend from the second common horizontal portion 82a.

First and second thin film transistors (TFTs) T1 and T2 each connected to the gate line 20 and the data line 30 are formed in the first and second pixel regions P1 and P2, respectively. The first TFT T1 includes a first gate electrode 25a, a first semiconductor layer (not shown) over the first gate electrode 25a, a first source electrode 32a connected to the data line 30 and a first drain electrode 34a spaced apart the first source electrode 32a. Similarly, the second TFT T2 includes a second gate electrode 25b, a second semiconductor layer (not shown) over the second gate electrode 25b, a second source electrode 32b connected to the data line 30 and a second drain electrode 34b spaced apart the second source electrode 32b. The first semiconductor layer includes a first active layer of intrinsic amorphous silicon (a-Si:H) and a first ohmic contact layer of impurity-doped amorphous silicon (n+a-Si:H), and the second semiconductor layer includes a second active layer of intrinsic amorphous silicon (a-Si:H) and a second ohmic contact layer of impurity-doped amorphous silicon (n+a-Si:H).

Further, first and second pixel electrodes 71 and 72 are formed in the first and second pixel regions P1 and P2, respectively. The first pixel electrode 71 is connected to the first drain electrode 34a through a first drain contact hole CH1, and the second pixel electrode 72 is connected to the second drain electrode 34b through a second drain contact hole CH2. The first pixel electrode 71 includes a first pixel horizontal portion 71a contacting the first drain electrode 34a and a plurality of first pixel vertical portions 71b perpendicularly extending from the first pixel horizontal portion 71a. Similarly, the second pixel electrode 72 includes a second pixel horizontal portion 72a contacting the second drain electrode 34b and a plurality of second pixel vertical portions 72b perpendicularly extending from the second pixel horizontal portion 72a.

FIG. 2 is a cross-sectional view, which corresponds to a line II-II of FIG. 1, showing an in-plane switching mode liquid crystal display device according to the related art. In FIG. 2, first and second substrates 5 and 10 face and are spaced apart from each other, and a liquid crystal layer 15 is interposed between the first and second substrates 5 and 10. The first and second substrates 5 and 10 include a display area AA and a non-display area NAA. A black matrix 12 shielding light is formed on an inner surface of the first substrate 5 in the non-display area NAA. A color filter layer 16 and an overcoat layer 18 are sequentially formed on the black matrix 12. The color filter layer 16 includes a red color filter 16a, a green color filter 16b and a blue color filter (not shown).

A gate line 20 (of FIG. 1), a first gate electrode 25a (of FIG. 1) and a second gate electrode 25b (of FIG. 1) are formed on the second substrate 10. A gate insulating layer 45 is formed on the gate line 20, the first gate electrode 25a and the second gate electrode 25b. A data line 30 is formed on the gate insulating layer 45. The data line 30 crosses the gate line 20 to define first and second pixel regions P1 and P2. A passivation layer 55 is formed on the data line 30. A plurality of first common vertical portions 81b of a first common electrode 81 (of FIG. 1) and a plurality of first pixel vertical portions 71b of a first pixel electrode 71 (of FIG. 1) are formed on the passivation layer 55 in the first pixel region P1. In addition, a plurality of second common vertical portions 82b of a second common electrode 82 (of FIG. 1) and a plurality of second pixel vertical portions 72b of a second pixel electrode 72 (of FIG. 1) are formed on the passivation layer 55 in the second pixel region P2. The plurality of first common vertical portions 81b and the plurality of first pixel vertical portions 71b alternate with each other in the first pixel region P1, and the plurality of second common vertical portions 82b and the plurality of second pixel vertical portions 72b alternate with each other in the second pixel region P2.

In the first pixel region P1, when a first common voltage and a first pixel voltage are applied to the plurality of first common vertical portions 81b and the plurality of first pixel vertical portions 71b, a first horizontal electric field E1 is generated between the first common vertical portion 81b and the first pixel vertical portion 71b, and liquid crystal molecules 14 of the liquid crystal layer 15 are controlled by the first horizontal electric field E1 such that light of a backlight unit is transmitted through the liquid crystal layer 15 with a first transmittance. In the second pixel region P2, when a second common voltage and a second pixel voltage are applied to the plurality of second common vertical portions 82b and the plurality of second pixel vertical portions 72b, a second horizontal electric field E2 is generated between the second common vertical portion 82b and the second pixel vertical portion 72b, and liquid crystal molecules 14 of the liquid crystal layer 15 are controlled by the second horizontal electric field E2 such that light of the backlight unit is transmitted through the liquid crystal layer 15 with a second transmittance. As a result, the IPS mode LCD device displays a color image.

However, since a vertical electric field instead of a horizontal electric field is generated in an electrode portion F over each of the plurality of first common vertical portions 81b, the plurality of first pixel vertical portions 71b, the plurality of second common vertical portions 82b and the plurality of second pixel vertical portions 72b, the liquid crystal molecules 14 in the electrode portion F can not be horizontally rotated and a required transmittance is not obtained in the electrode portion F. Accordingly, total transmittance and aperture ratio of the IPS mode LCD device are deteriorated.

SUMMARY OF THE INVENTION

Accordingly, embodiments of the invention are directed to an array substrate for an in-plane switching mode liquid crystal display device and a method of fabricating the array substrate that substantially obviate one or more of problems due to limitations and disadvantages of the related art.

An advantage of the invention is to provide an array substrate for an IPS mode LCD device where transmittance and aperture ratio are improved and a method of fabricating the array substrate.

Another advantage of the invention is to provide an array substrate for an IPS mode LCD device where a display quality is improved due to reduction in a parasitic capacitance and release of a direct current stress and a method of fabricating the array substrate.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, according to an aspect of the invention, an array substrate for an in-plane switching mode liquid crystal display device includes: a substrate; a gate line on the substrate; first and second common lines parallel to and spaced apart from the gate line; a data line crossing the gate line to define a pixel region; a thin film transistor connected to the gate line and the data line; a pixel electrode connected to the thin film transistor, the pixel electrode having a plate shape; a plurality of common electrodes connected between the first and second common lines, the plurality of common electrodes overlapping the pixel electrode; and first and second shielding electrodes parallel to the data line, the first and second shielding electrodes spaced apart from each other with respect to the data line.

In another aspect, an array substrate for an in-plane switching mode liquid crystal display device includes: a substrate; a gate line and a data line on the substrate, the gate line crossing the data line to define a pixel region; a thin film transistor connected to the gate line and the data line; a pixel electrode in the pixel region and connected to the thin film transistor; a plurality of common electrodes in the pixel region, the plurality of common electrodes overlapping the pixel electrodes; and a shielding electrode over the data line, the shielding electrode including first and second portions overlapping opposite end portions of the data line.

In another aspect, a method of fabricating an array substrate for an in-plane switching mode liquid crystal display device includes: forming a gate line and a gate electrode on a substrate, the gate electrode connected to the gate line; forming a gate insulating layer on the gate line and the gate electrode; forming a semiconductor layer on the gate insulating layer over the gate electrode; forming a source electrode, a drain electrode and a data line, the source and drain electrodes spaced apart from each other and formed on the semiconductor layer, the data line crossing the gate line to define a pixel region; forming a pixel electrode in the pixel region, the pixel electrode connected to the drain electrode; and forming a plurality of common electrodes over the pixel electrode and a shielding electrode over the data line, the shielding electrode including first and second portions overlapping opposite end portions of the data line.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the illustrated embodiments of the present invention, which are illustrated in the accompanying drawings.

Figure 1:
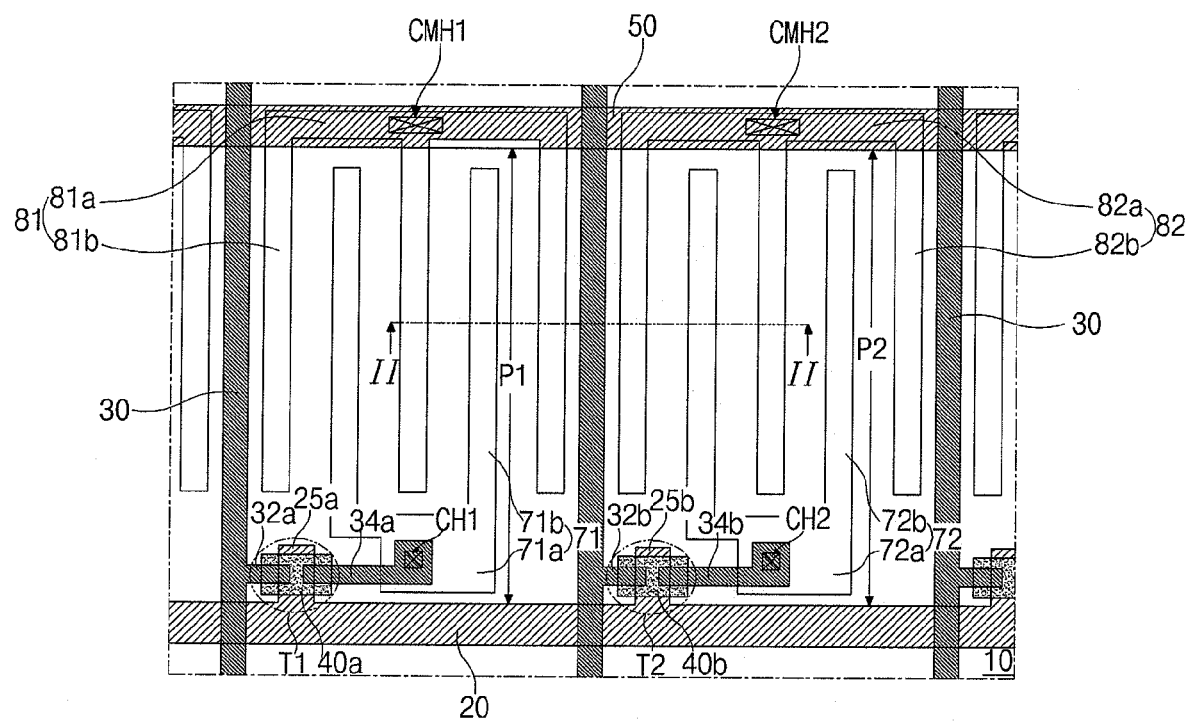
FIG. 1 is a plan view showing an array substrate for an in-plane switching mode liquid crystal display device according to the related art.
Figure 2:
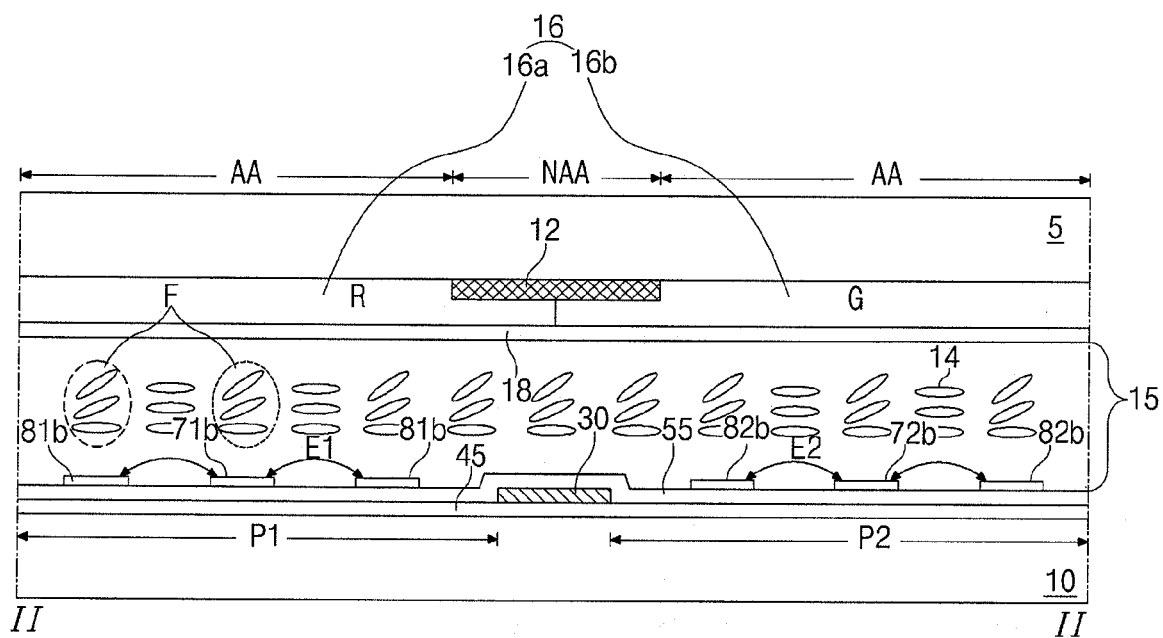
FIG. 2 is a cross-sectional view, which corresponds to a line II-II of FIG. 1, showing an in-plane switching mode liquid crystal display device according to the related art.
Figure 3:
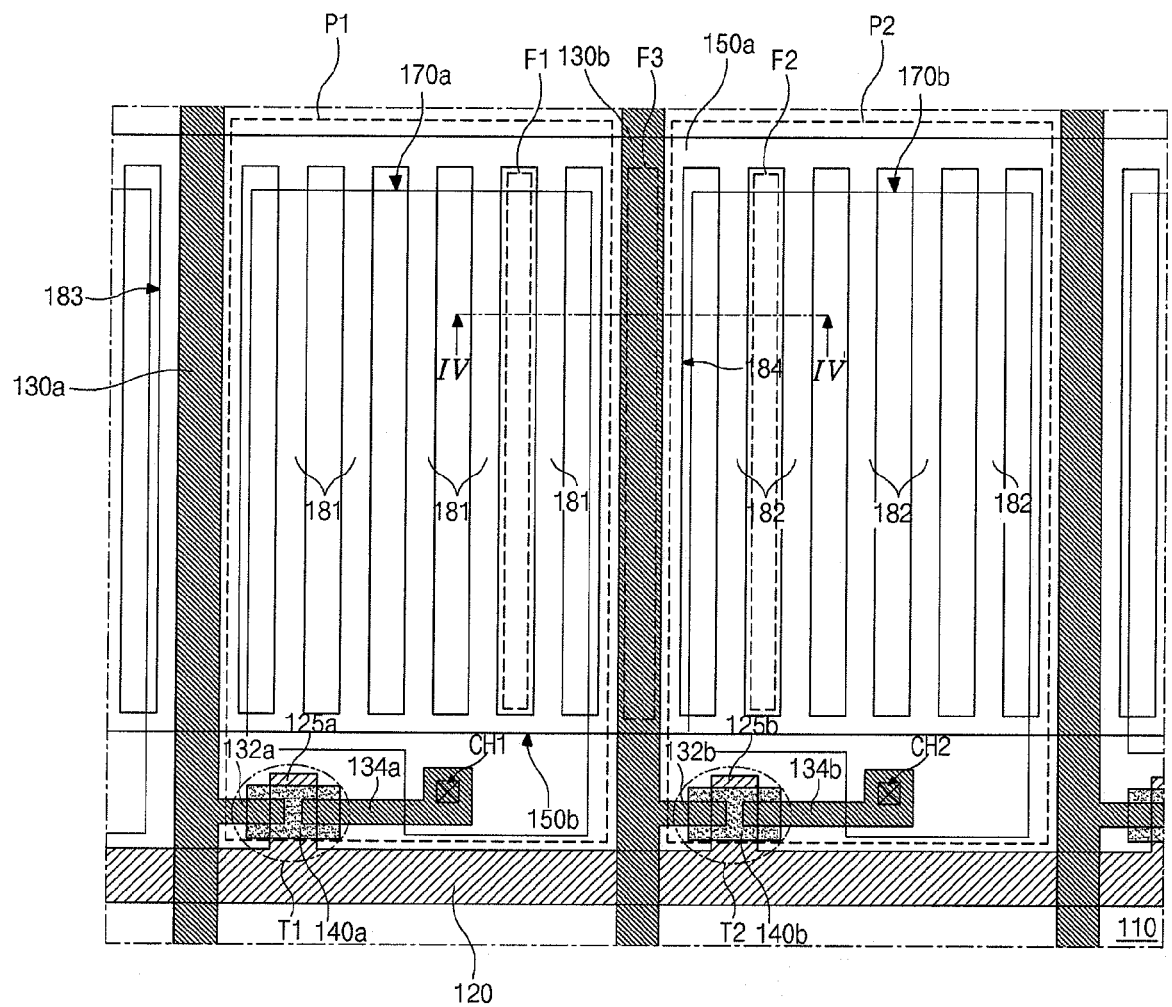
FIG. 3 is a plan view showing an array substrate for an IPS mode LCD device according to a first embodiment of the present invention.

FIG. 3 is a plan view showing an array substrate for an IPS mode LCD device according to a first embodiment of the present invention.

In FIG. 3, a gate line 120 is formed on a substrate 110 along a first direction, and first and second data lines 130a and 130b are formed over the substrate 110 along a second direction perpendicular to the first direction. The first and second data lines 130a and 130b cross the gate line 120 to define first and second pixel regions P1 and P2, respectively.

A first thin film transistor (TFT) T1 connected to the gate line 120 and the first data line 130a is formed in the first pixel region P1, and a second TFT T2 connected to the gate line 120 and the second data line 130b is formed in the second pixel region P2. The first TFT T1 includes a first gate electrode 125a extending from the gate line 120, a first semiconductor layer (not shown) over the first gate electrode 125a, a first source electrode 132a extending from the first data line 130a and a first drain electrode 134a separated from the first source electrode 132a. Similarly, the second TFT T2 includes a second gate electrode 125b extending from the gate line 120, a second semiconductor layer (not shown) over the second gate electrode 125b, a second source electrode 132b extending from the second data line 130b and a second drain electrode 134b separated from the second source electrode 132b. The first semiconductor layer includes a first active layer 140a of intrinsic amorphous silicon (a-Si:H) and a first ohmic contact layer of impurity-doped amorphous silicon (n+a-Si:H), and the second semiconductor layer includes a second active layer 140b of intrinsic amorphous silicon (a-Si:H) and a second ohmic contact layer of impurity-doped amorphous silicon (n+a-Si:H).

A first passivation layer (not shown) is formed on the first and second TFTs T1 and T2, and first and second pixel electrodes 170a and 170b are formed on the first passivation layer in the first and second pixel regions P1 and P2, respectively. The first pixel electrode 170a is connected to the first drain electrode 134a through a first drain contact hole CH1 in the first passivation layer, and the second pixel electrode 170b is connected to the second drain electrode 134b through a second drain contact hole CH2 in the first passivation layer. In addition, each of the first and second pixel electrodes 170a and 170b has a plate shape.

A second passivation layer (not shown) is formed on the first and second pixel electrodes 170a and 170b, and first and second common lines 150a and 150b parallel to the gate line 120 are formed on the second passivation layer. The first and second common lines 150a and 150b are spaced apart from each other. In addition, a plurality of first common electrodes 181 are connected between the first and second common lines 150a and 150b in the first pixel region P1 and a plurality of second common electrodes 182 are connected between the first and second common lines 150a and 150b in the second pixel region P2. Each of the plurality of first common electrodes 181 and the plurality of second common electrodes 182 has a bar shape. Further, a first shielding electrode 183 is connected between the first and second common lines 150a and 150b over the first data line 130a, and a second shielding electrode 184 is connected between the first and second common lines 150a and 150b over the second data line 130b.

The first and second shielding electrodes 183 and 184 completely cover and overlap the first and second data lines 130a and 130b, respectively. The first and second common lines 150a and 150b, the plurality of first common electrodes 181, the plurality of second common electrodes 182 and the first and second shielding electrodes 183 and 184 may be formed in the same layer and may include a transparent conductive material such as indium-tin-oxide (ITO) and indium-zinc-oxide (IZO). In addition, a common voltage may be applied to the first and second common lines 150a and 150b, the plurality of first common electrodes 181, the plurality of second common electrodes 182 and the first and second shielding electrodes 183 and 184.

Since the plurality of first common electrodes 181 and the plurality of second common electrodes 182 overlap the first and second pixel electrodes 170a and 170b, respectively, with the second passivation layer interposed therebetween, an electric field having horizontal and vertical parts is generated in a first portion F1 over the first pixel electrode 170a exposed between the first common electrodes 181 and in a second portion F2 over the second pixel electrode 170b exposed between the second common electrodes 182. Accordingly, liquid crystal molecules in the first and second portions F1 and F2 are controlled by the electric field, and total transmittance and aperture ratio are improved.

Figure 4:
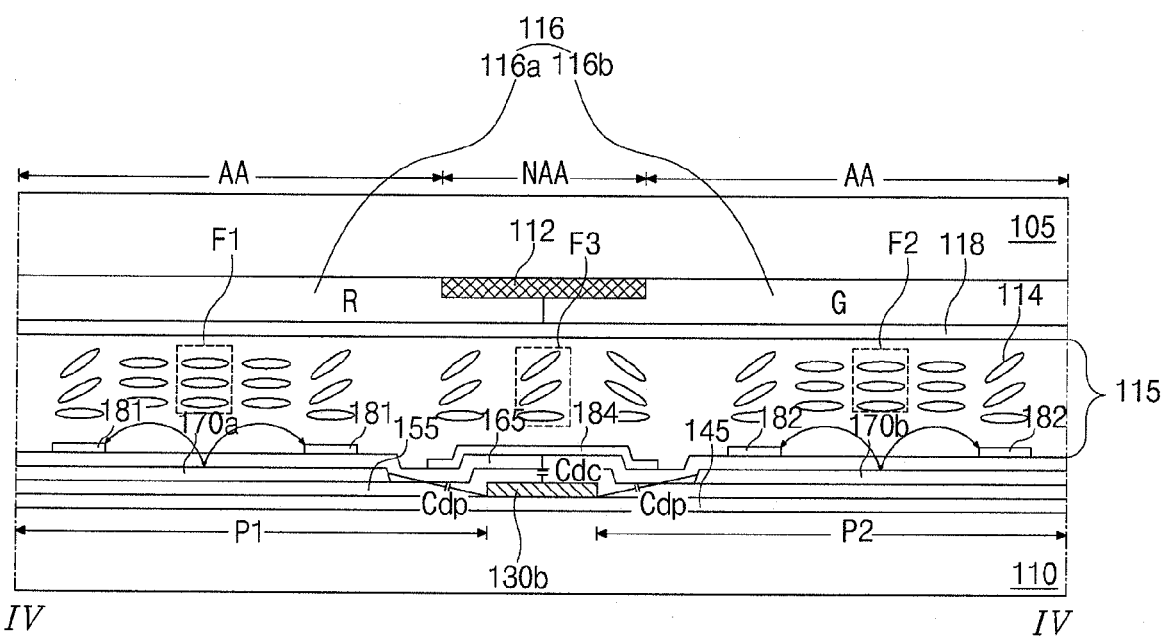
FIG. 4 is a cross-sectional view, which corresponds to a line IV-IV of FIG. 3, showing an IPS mode LCD device according to a first embodiment of the present invention.

FIG. 4 is a cross-sectional view, which corresponds to a line IV-IV of FIG. 3, showing an IPS mode LCD device according to a first embodiment of the present invention.

In FIG. 4, first and second substrates 105 and 110 face and are spaced apart from each other, and a liquid crystal layer 115 is formed between the first and second substrates 105 and 110. The first and second substrates 105 and 110 include a display area AA and a non-display area NAA. A black matrix 112 shielding light is formed on an inner surface of the first substrate 105 in the non-display area NAA. A color filter layer 116 and an overcoat layer 118 are sequentially formed on the black matrix 112. The color filter layer 116 includes a red color filter 116a, a green color filter 116b and a blue color filter (not shown).

A gate line 120 (of FIG. 3), a first gate electrode 125a (of FIG. 3) and a second gate electrode 125b (of FIG. 3) are formed on an inner surface of the second substrate 110. A gate insulating layer 145 is formed on the gate line 120, the first gate electrode 125a and the second gate electrode 125b. A first data line 130a (of FIG. 3) and a second data line 130b are formed on the gate insulating layer 145. The first and second data lines 130a and 130b cross the gate line 120 to define first and second pixel regions P1 and P2, respectively. A first passivation layer 155 is formed on the first and second data lines 130a and 130b. First and second pixel electrodes 170a and 170b are formed on the first passivation layer 155 in the first and second pixel regions P1 and P2, respectively. Each of the first and second pixel electrodes 170a and 170b has a plate shape.

A second passivation layer 165 is formed on the first and second pixel electrodes 170a and 170b. A plurality of first common electrodes 181, a plurality of second common electrodes 182, a first shielding electrode 183 (of FIG. 3) and a second shielding electrode 184 are formed on the second passivation layer 165. The plurality of first common electrodes 181 and the plurality of second common electrodes 182 each having a bar shape are parallel to and spaced apart from each other. The plurality of first common electrodes 181 overlap the first pixel electrode 170a in the first pixel region P1 and the plurality of second common electrodes 182 overlap the second pixel electrode 170b in the second pixel region P2. The second shielding electrode 184 completely covers the second data line 130b.

Since the plurality of first common electrodes 181 and the plurality of second common electrodes 182 overlap the first and second pixel electrodes 170a and 170b, respectively, with the second passivation layer 165 interposed therebetween, an electric field having horizontal and vertical parts is generated in a first portion F1 over the first pixel electrode 170a exposed between the first common electrodes 181 and in a second portion F2 over the second pixel electrode 170b exposed between the second common electrodes 182. Accordingly, liquid crystal molecules in the first and second portions F1 and F2 are controlled by the electric field, and total transmittance and aperture ratio are improved.

The second shielding electrode 184 reduces data-pixel parasitic capacitances Cdp between the second data line 130b and the first pixel electrode 170a and between the second data line 130b and the second pixel electrode 170b. In addition, the second shielding electrode 184 reduces light leakage through a gap portion between the second data line 130b and each of the first and second pixel electrodes 170a and 170b. Since a common voltage is applied to the second shielding electrode 184, a gap electric field is generated in the portion between the second data line 130b and each of the first and second pixel electrodes 170a and 170b and the liquid crystal molecules in the gap portion is controlled by the gap electric field. As a result, the light leakage due to uncontrolled liquid crystal molecules is reduced, and total transmittance and aperture ratio of the IPS mode LCD device are improved.

However, since the second shielding electrode 184 completely covers the second data line 130b, a data-common parasitic capacitance Cdc is generated between the second shielding electrode 184 and the second data line 130b. As a size of the LCD device increases, the data-common parasitic capacitance Cdc increases due to increase in areas of the second shielding electrode 184 and the data line 130b. Since the increase of the data-common parasitic capacitance Cdc causes a delay of a data signal by resistance-capacitance (RC) time delay, the data signal may not be sufficiently charged in the pixel electrode. Further, the common voltage applied to the plurality of first common electrodes 181, the plurality of second common electrodes 182 and the second shielding electrode 184 may be shifted. The shift of the common voltage causes deterioration of the IPS mode LCD device such as flicker. In addition, since only a vertical electric field is generated in a third portion F3 over a central portion of the second shielding electrode 184, the liquid crystal molecules in the third portion F3 are not driven while the IPS mode LCD device operates. As a result, a direct current (DC) stress is applied to the liquid crystal molecules and the second shielding electrode 184, thereby the shift of the common voltage further increasing.

Figure 5A:
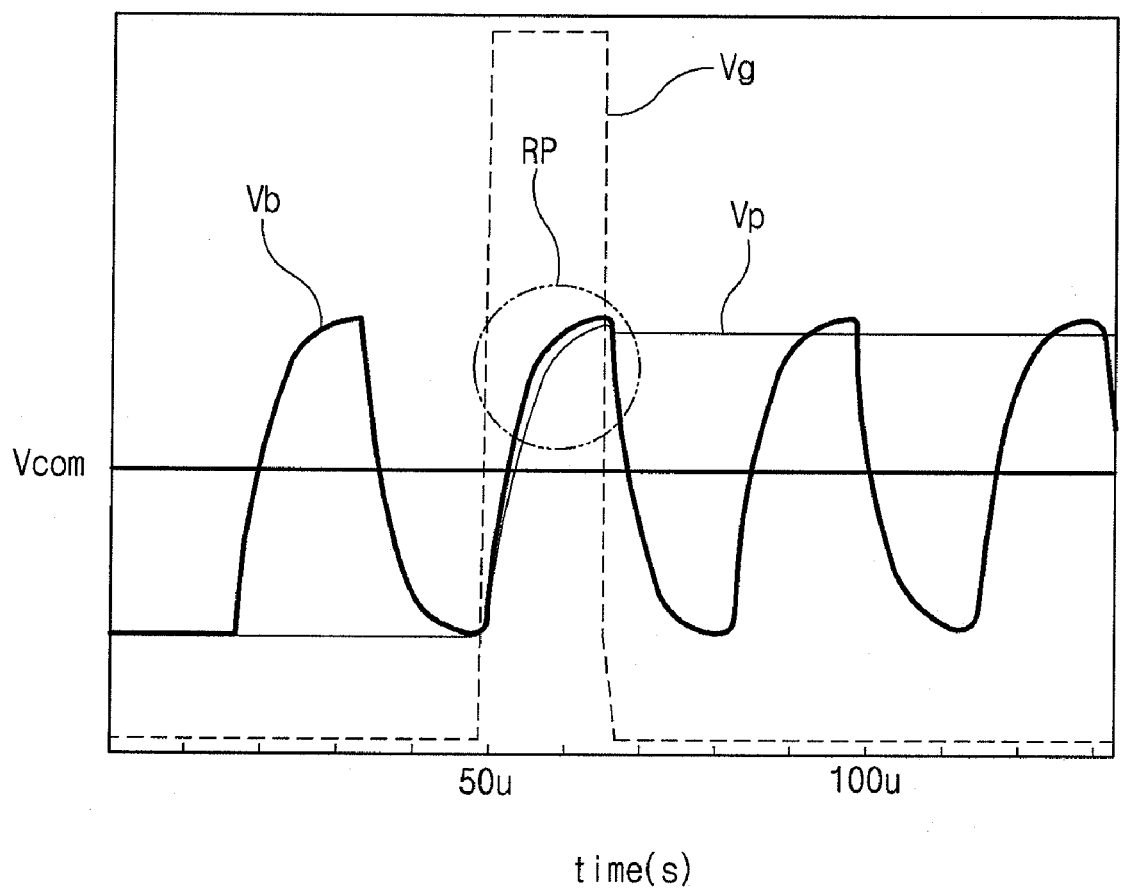
FIG. 5A is a graph showing voltage signals of an IPS mode LCD device of FIG. 4.
Figure 5B:
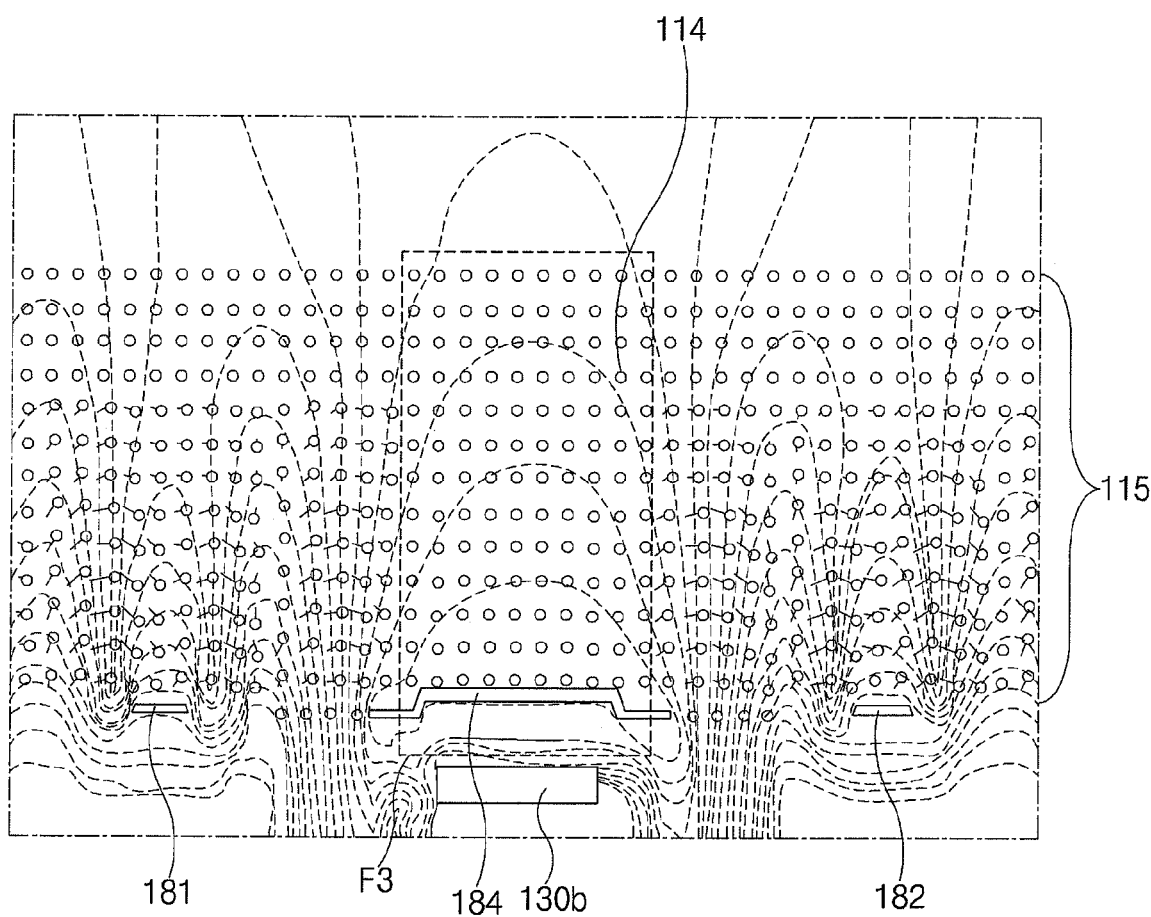
FIG. 5B is a simulated cross-sectional view showing an electric field and liquid crystal molecules of an IPS mode LCD device of FIG. 4.

FIG. 5A is a graph showing voltage signals of an IPS mode LCD device of FIG. 4 and FIG. 5B is a simulated cross-sectional view showing an electric field and liquid crystal molecules of an IPS mode LCD device of FIG. 4.

In FIG. 5A, a gate voltage Vg, a data voltage Vd, a common voltage Vcom and a pixel voltage Vp are shown with respect to a time axis. The gate voltage Vg is supplied to the gate line 120 (of FIG. 4) and the common voltage Vcom is supplied to the second shielding line 184 (of FIG. 4). The data voltage Vd is supplied to the second data line 130b (of FIG. 4). In addition, the data voltage Vd is applied to the second pixel electrode 170b (of FIG. 4) through the second TFT T2 (of FIG. 4) and is kept as the pixel voltage Vp in the second pixel electrode 170b. A resistance of the second data line 130b is measured as about 25.3 kΩ and the data-common parasitic capacitance Cdc between the second data line 130b and the second shielding electrode 184 is measured as about 327.6 pF. Since the data-common parasitic capacitance Cdc is relatively high, the data voltage Vd is delayed such that a rising portion RP of the data voltage Vd and the pixel voltage Vp has a gentle edge (longer rising time). As a result, the data voltage Vd is not sufficiently charged in the second pixel electrode 170b during a charging time of about 12.08 μs.

In FIG. 5B, the second shielding electrode 184 is formed over the second data line 130b, and the first and second common electrodes 181 and 182 are formed at both sides of the second shielding electrode 184. The other structure such as the first and second passivation layers 155 and 165 (of FIG. 4) and the first and second pixel electrodes 170a and 170b (of FIG. 4) are omitted for simplicity. While the IPS mode LCD device operates, an electric field is generated and the liquid crystal molecules 114 of the liquid crystal layer 115 are driven by the electric field. The solid line of FIG. 5B represents an equipotential line perpendicular to the electric field direction. Although the electric field has vertical and horizontal parts, the electric field of the third portion F3 has nearly only the vertical part. Accordingly, the liquid crystal molecules 114 in the third portion F3 are not driven while the IPS mode LCD device operates. As a result, a direct current (DC) stress is applied to the liquid crystal layer 115 and charges are accumulated on the second shielding electrode 184. The DC stress causes the shift of the common voltage.

To solve the above problems, the second shielding electrode has an open portion in an array substrate according to a second embodiment.

Figure 6:
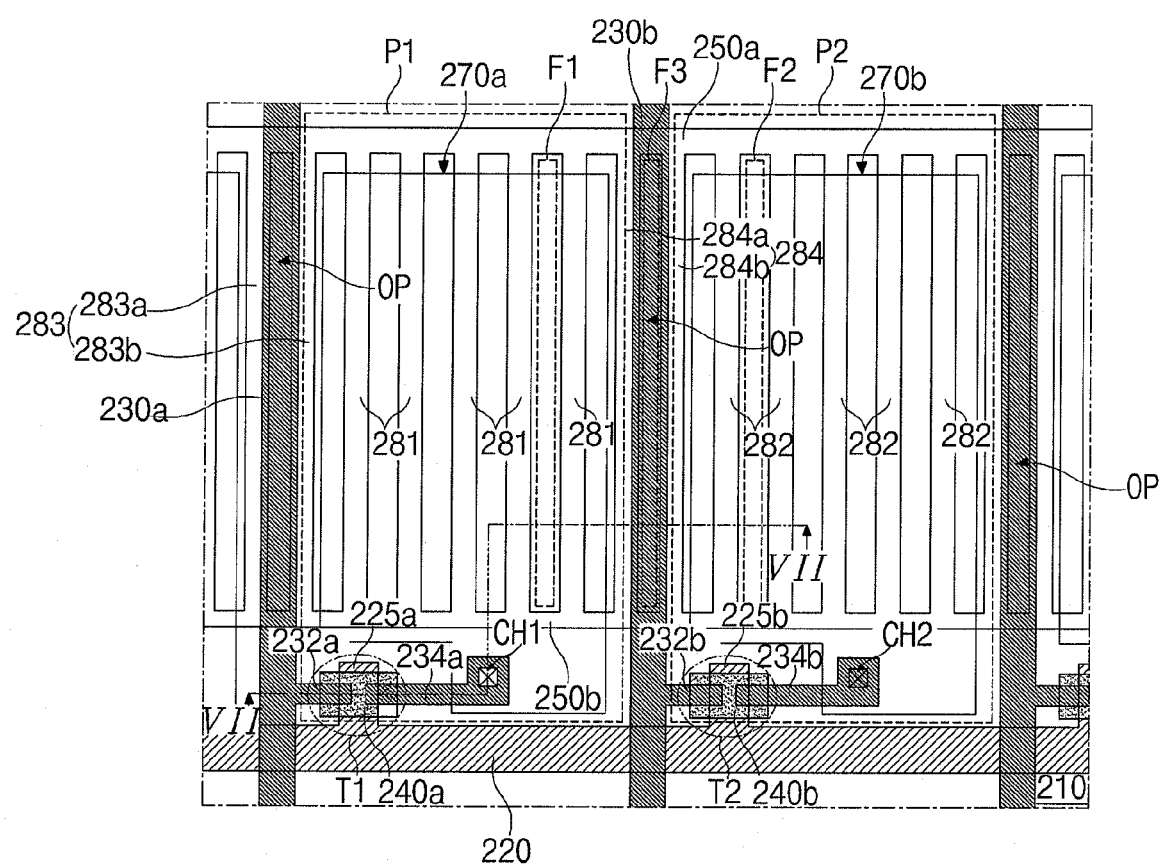
FIG. 6 is a plan view showing an array substrate for an IPS mode LCD device according to a second embodiment of the present invention.

FIG. 6 is a plan view showing an array substrate for an IPS mode LCD device according to a second embodiment of the present invention.

In FIG. 6, a gate line 220 is formed on a substrate 210 along a first direction, and first and second data lines 230a and 230b are formed over the substrate 210 along a second direction perpendicular to the first direction. The first and second data lines 230a and 230b cross the gate line 220 to define first and second pixel regions P1 and P2, respectively.

A first thin film transistor (TFT) T1 connected to the gate line 220 and the first data line 230a is formed in the first pixel region P1, and a second TFT T2 connected to the gate line 220 and the second data line 230b is formed in the second pixel region P2. The first TFT T1 includes a first gate electrode 225a extending from the gate line 220, a first semiconductor layer (not shown) over the first gate electrode 225a, a first source electrode 232a extending from the first data line 230a and a first drain electrode 234a separated from the first source electrode 232a. Similarly, the second TFT T2 includes a second gate electrode 225b extending from the gate line 220, a second semiconductor layer (not shown) over the second gate electrode 225b, a second source electrode 232b extending from the second data line 230b and a second drain electrode 234b separated from the second source electrode 232b. The first semiconductor layer includes a first active layer 240a of intrinsic amorphous silicon (a-Si:H) and a first ohmic contact layer of impurity-doped amorphous silicon (n+a-Si:H), and the second semiconductor layer includes a second active layer 240b of intrinsic amorphous silicon (a-Si:H) and a second ohmic contact layer of impurity-doped amorphous silicon (n+a-Si:H).

A first passivation layer (not shown) is formed on the first and second TFTs T1 and T2, and first and second pixel electrodes 270a and 270b are formed on the first passivation layer in the first and second pixel regions P1 and P2, respectively. The first pixel electrode 270a is connected to the first drain electrode 234a through a first drain contact hole CH1 in the first passivation layer, and the second pixel electrode 270b is connected to the second drain electrode 234b through a second drain contact hole CH2 in the first passivation layer. In addition, each of the first and second pixel electrodes 270a and 270b has a plate shape.

A second passivation layer (not shown) is formed on the first and second pixel electrodes 270a and 270b, and first and second common lines 250a and 250b parallel to the gate line 220 are formed on the second passivation layer. The first and second common lines 250a and 250b are spaced apart from each other. In addition, a plurality of first common electrodes 281 are connected between the first and second common lines 250a and 250b in the first pixel region P1 and a plurality of second common electrodes 282 are connected between the first and second common lines 250a and 250b in the second pixel region P2. Each of the plurality of first common electrodes 281 and the plurality of second common electrodes 282 has a bar shape. Further, a first shielding electrode 283 is connected between the first and second common lines 250a and 250b over the first data line 230a, and a second shielding electrode 284 is connected between the first and second common lines 250a and 250b over the second data line 230b.

Although not shown in FIG. 6, the first and second common lines 250a and 250b may horizontally extend throughout the second substrate 210. Further, although each of the plurality of first common electrodes 281 and the plurality of second common electrodes 282 has a bar shape parallel to the first and second data lines 230a and 230b, each of the plurality of first common electrodes 281 and the plurality of second common electrodes 282 may have a zigzag shape in another embodiment and may be disposed parallel to the gate line 220 in another embodiment.

Each of the first and second shielding electrodes 283 and 284 includes an open portion OP. Accordingly, the first shielding electrode 283 has first and second portions 283a and 283b that constitute the open portion OP exposing the first data line 230a, and the second shielding electrode 284 has first and second portions 284a and 284b that constitute the open portion OP exposing the second data line 230b. Each of the first and second portions 283a, 283b, 284a and 284b is parallel to the first and second data lines 230a and 230b. As a result, the first and second shielding electrodes 283 and 284 partially cover and overlap the first and second data lines 230a and 230b, respectively.

The first and second common lines 250a and 250b, the plurality of first common electrodes 281, the plurality of second common electrodes 282 and the first and second shielding electrodes 283 and 284 may be formed in the same layer and may include a transparent conductive material such as indium-tin-oxide (ITO) and indium-zinc-oxide (IZO). In addition, a common voltage may be applied to the first and second common lines 250a and 250b, the plurality of first common electrodes 281, the plurality of second common electrodes 282 and the first and second shielding electrodes 283 and 284.

Since the plurality of first common electrodes 281 and the plurality of second common electrodes 282 overlap the first and second pixel electrodes 270a and 270b, respectively, with the second passivation layer interposed therebetween, an electric field having horizontal and vertical parts is generated in a first portion F1 over the first pixel electrode 270a exposed between the first common electrodes 181 and in a second portion F2 over the second pixel electrode 270b exposed between the second common electrodes 282. Accordingly, liquid crystal molecules in the first and second portions F1 and F2 are controlled by the electric field, and total transmittance and aperture ratio are improved.

Further, since each of the first and second shielding electrodes 283 and 284 has the first and second portions overlapping opposite end portions of each of the first and second data lines 230a and 230b, a data-pixel parasitic capacitance Cdp is reduced and a light leakage through a gap portion is reduced so that total transmittance and aperture ratio can be improved. In addition, since each of the first and second shielding electrodes 283 and 284 includes the open portion OP, overlapping areas of the first shielding electrode 283 and the first data line 230a and of the second shielding electrode 284 and the second data line 230b are reduced. Accordingly, a data-common parasitic capacitance Cdc is reduced and a delay of a data signal is improved so that a shift of a common voltage can be reduced. Moreover, since an electric field having vertical and horizontal parts is generated in a third portion F3 between the first shielding electrode 283 and the first data line 230a and between the second shielding electrode 284 and the second data line 230b through the open portion OP, the liquid crystal molecules in the third portion F3 are driven by the electric field, and a direct current (DC) stress is released. As a result, the shift of the common voltage is further reduced.

Figure 7:
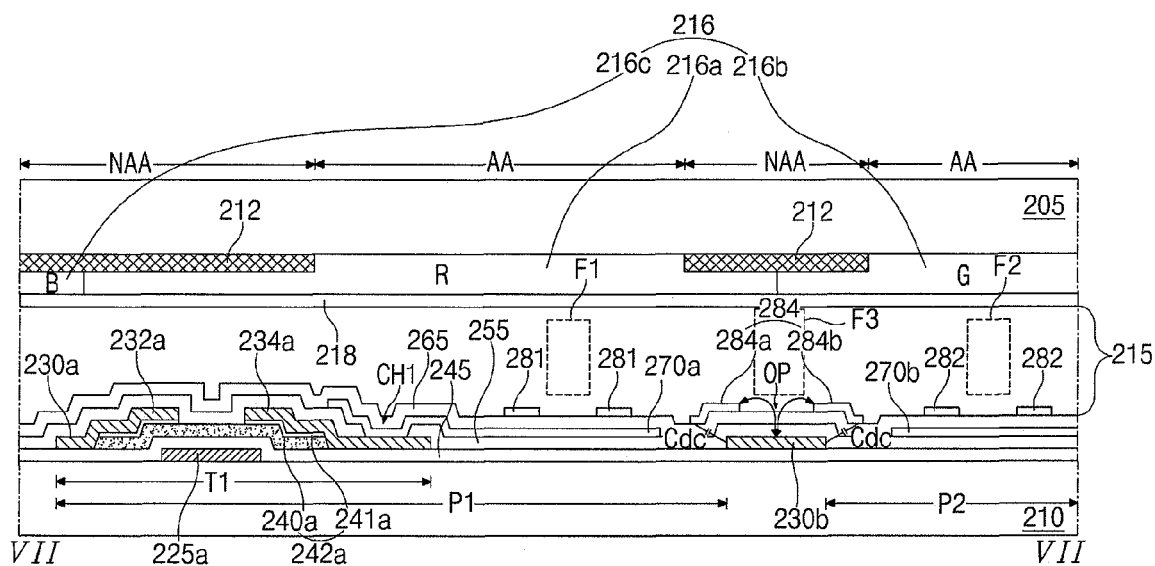
FIG. 7 is a cross-sectional view, which corresponds to a line VII-VII of FIG. 6, showing an IPS mode LCD device according to a second embodiment of the present invention.

FIG. 7 is a cross-sectional view, which corresponds to a line VII-VII of FIG. 6, showing an IPS mode LCD device according to a second embodiment of the present invention.

In FIG. 7, first and second substrates 205 and 210 face and are spaced apart from each other, and a liquid crystal layer 215 is formed between the first and second substrates 205 and 210. The first and second substrates 205 and 210 include a display area AA and a non-display area NAA. A black matrix 212 shielding light is formed on an inner surface of the first substrate 205 in the non-display area NAA. A color filter layer 216 and an overcoat layer 218 are sequentially formed on the black matrix 212. The color filter layer 216 includes a red color filter 216a, a green color filter 216b and a blue color filter 216c.

A gate line 220 (of FIG. 6), a first gate electrode 225a and a second gate electrode 225b (of FIG. 6) are formed on an inner surface of the second substrate 210. A gate insulating layer 245 is formed on the gate line 220, the first gate electrode 225a and the second gate electrode 225b. A first semiconductor layer 242a and a second semiconductor layers (not shown) are formed on the gate insulating layer 245. The first semiconductor layer 242a includes a first active layer 240a of intrinsic amorphous silicon (a-Si:H) and a first ohmic contact layer 241a of impurity-doped amorphous silicon (n+a-Si:H), and the second semiconductor layer includes a second active layer 240b (of FIG. 6) of intrinsic amorphous silicon (a-Si:H) and a second ohmic contact layer of impurity-doped amorphous silicon (n+a-Si:H). A first source electrode 232a and a first drain electrode 234a are formed on the first semiconductor layer 242a, and a second source electrode 232b (of FIG. 6) and a second source electrode 234b (of FIG. 6) are formed on the second semiconductor layer.

In addition, a first data line 230a and a second data line 230b are formed on the gate insulating layer 245. The first and second data lines 230a and 230b cross the gate line 220 to define first and second pixel regions P1 and P2, respectively. A first passivation layer 255 is formed on the first and second data lines 230a and 230b. First and second pixel electrodes 270a and 270b are formed on the first passivation layer 255 in the first and second pixel regions P1 and P2, respectively. Each of the first and second pixel electrodes 270a and 270b has a plate shape. The first pixel electrode 270a is connected to the first drain electrode 234a through a first drain contact hole CH1. Alternatively, the first pixel electrode may have the same layer as and a material different from the first drain electrode so that the first pixel electrode can directly contact the first drain electrode in another embodiment.

A second passivation layer 265 is formed on the first and second pixel electrodes 270a and 270b. A plurality of first common electrodes 281, a plurality of second common electrodes 282, a first shielding electrode 283 (of FIG. 6) and a second shielding electrode 284 are formed on the second passivation layer 265. The plurality of first common electrodes 281 and the plurality of second common electrodes 282 each having a bar shape are parallel to and spaced apart from each other. The plurality of first common electrodes 281 overlap the first pixel electrode 270a in the first pixel region P1 and the plurality of second common electrodes 282 overlap the second pixel electrode 270b in the second pixel region P2. The second shielding electrode 284 has first and second portions 284a and 284b each overlapping opposite end portions of the second data line 230b. Accordingly, the second shielding electrode 284 includes an open portion OP exposing the second data line 230b and partially overlaps the second data line 230b.

Since the plurality of first common electrodes 281 and the plurality of second common electrodes 282 overlap the first and second pixel electrodes 170a and 170b, respectively, with the second passivation layer 265 interposed therebetween, an electric field having horizontal and vertical parts is generated in a first portion F1 over the first pixel electrode 270a exposed between the first common electrodes 281 and in a second portion F2 over the second pixel electrode 270b exposed between the second common electrodes 182. Accordingly, liquid crystal molecules in the first and second portions F1 and F2 are controlled by the electric field, and total transmittance and aperture ratio are improved.

Further, since the second shielding electrode 284 has the first and second portions 284a and 284b overlapping opposite end portions of the second data line 230b, a data-pixel parasitic capacitance Cdp is reduced and a light leakage through a gap portion is reduced so that total transmittance and aperture ratio can be improved. In addition, since the second shielding electrode 284 includes the open portion OP, an overlapping area of the second shielding electrode 284 and the second data line 230b is reduced. Accordingly, a data-common parasitic capacitance Cdc is reduced and a delay of a data signal is improved so that a shift of a common voltage can be improved. Moreover, since an electric field having vertical and horizontal parts is generated in a third portion F3 between the second shielding electrode 284 and the second data line 230b through the open portion OP, the liquid crystal molecules in the third portion F3 are driven by the electric field, and a direct current (DC) stress is released. As a result, the shift of the common voltage is further improved.

Figure 8A:
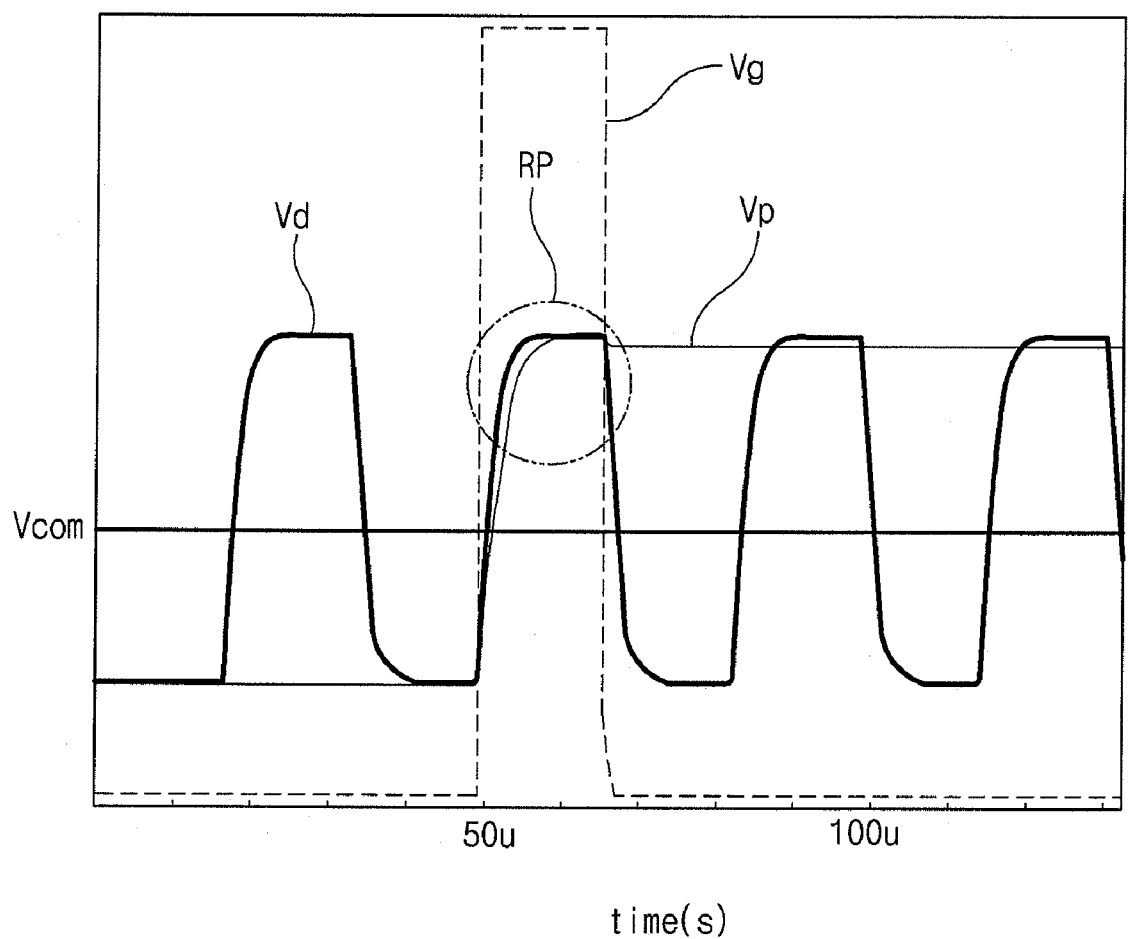
FIG. 8A is a graph showing voltage signals of an IPS mode LCD device of FIG. 6.
Figure 8B:
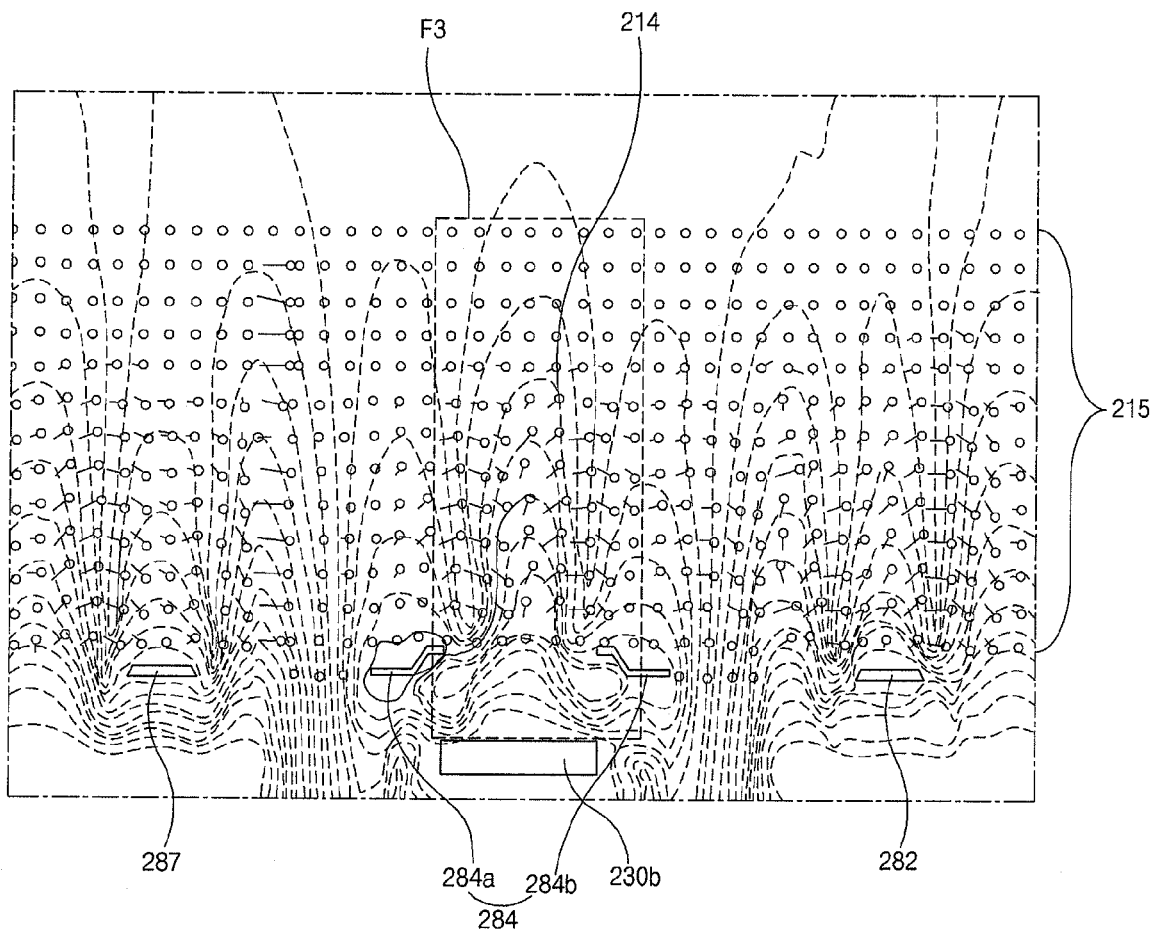
FIG. 8B is a simulated cross-sectional view showing an electric field and liquid crystal molecules of an IPS mode LCD device of FIG. 6.

FIG. 8A is a graph showing voltage signals of an IPS mode LCD device of FIG. 6 and FIG. 8B is a simulated cross-sectional view showing an electric field and liquid crystal molecules of an IPS mode LCD device of FIG. 6.

In FIG. 8A, a gate voltage Vg, a data voltage Vd, a common voltage Vcom and a pixel voltage Vp are shown with respect to a time axis. The gate voltage Vg is supplied to the gate line 220 (of FIG. 6) and the common voltage Vcom is supplied to the second shielding line 284 (of FIG. 6). The data voltage Vd is supplied to the second data line 230b (of FIG. 6). In addition, the data voltage Vd is applied to the second pixel electrode 270b (of FIG. 6) through the second TFT T2 (of FIG. 6) and is kept as the pixel voltage Vp in the second pixel electrode 270b. A resistance of the second data line 230b is measured as about 25.3 kΩ, which is substantially the same as the resistance of the IPS mode LCD device of FIG. 4, and the data-common parasitic capacitance Cdc between the second data line 230b and the second shielding electrode 284 is measured as about 148.6 pF, which is only about 36% of the data-common parasitic capacitance Cdc of the IPS mode LCD device of FIG. 4. Since the data-common parasitic capacitance Cdc is reduced, the delay of the data voltage Vd is improved such that a rising portion RP of the data voltage Vd and the pixel voltage Vp has a steep edge (shorter rising time). As a result, the data voltage Vd is sufficiently charged in the second pixel electrode 270b during a charging time of about 12.08 μs.

In FIG. 8B, the second shielding electrode 284 is formed over the second data line 230b, and the first and second common electrodes 281 and 282 are formed at both sides of the second shielding electrode 284. The other structure such as the first and second passivation layers 255 and 265 (of FIG. 6) and the first and second pixel electrodes 270a and 270b (of FIG. 6) are omitted for simplicity. While the IPS mode LCD device operates, an electric field is generated and the liquid crystal molecules 214 of the liquid crystal layer 215 are driven by the electric field. The solid line of FIG. 8B represents an equipotential line perpendicular to the electric field direction. The electric field of the third portion F3 has vertical and horizontal parts. Accordingly, the liquid crystal molecules 214 in the third portion F3 are driven while the IPS mode LCD device operates. As a result, a direct current (DC) stress applied to the liquid crystal layer 215 is released and charges are not accumulated on the second shielding electrode 384. Therefore, the shift of the common voltage is further improved and the common voltage is stabilized.

It will be apparent to those skilled in the art that various modifications and variations can be made in an array substrate for an IPS mode LCD device and a method of fabricating the array substrate of embodiments of the invention without departing from the spirit or scope of the invention. Thus, it is intended that embodiments of the invention cover the modifications and variations of this invention provided they come within the scope of the appended claims and their equivalents.

What is claimed is:

1. An array substrate for an in-plane switching mode liquid crystal display device, comprising:
a substrate;
a gate line on the substrate;
first and second common lines parallel to and spaced apart from the gate line;
a data line crossing the gate line to define a pixel region;
a thin film transistor connected to the gate line and the data line;
a pixel electrode connected to the thin film transistor, the pixel electrode having a plate shape;
a plurality of common electrodes connected between the first and second common lines, the plurality of common electrodes overlapping the pixel electrode; and
first and second shielding electrodes parallel to the data line, the first and second shielding electrodes spaced apart from each other with respect to the data line,
wherein the first and second shielding electrodes overlap the data line continuously along the data line between the first and second common lines, and wherein the first and second shielding electrodes are positioned over the data line.

2. The array substrate according to claim 1, wherein the plurality of common electrodes are parallel to and spaced apart from each other and each of the plurality of common electrodes has a bar shape.

3. The array substrate according to claim 1, wherein the first common line, the second common line, the first shielding electrode and the second shielding electrode have a same layer and a same material as each other.

4. The array substrate according to claim 3, wherein a common voltage is applied to each of the first common line, the second common line, the first shielding electrode and the second shielding electrode.

5. The array substrate according to claim 3, wherein each of the first common line, the second common line, the first shielding electrode and the second shielding electrode includes a transparent conductive material.

6. The array substrate according to claim 1, wherein a central portion of the data line is exposed through the first and second shielding electrodes.

7. The array substrate according to claim 1, further comprising a first passivation layer between the thin film transistor and the pixel electrode, wherein the first passivation layer includes a drain contact hole exposing the thin film transistor.

8. The array substrate according to claim 7, further comprising a second passivation layer between the pixel electrode and each of the first and second shielding electrodes.

9. The array substrate according to claim 1, wherein the pixel electrode has the same layer as and a material different from a drain electrode of the thin film transistor, and wherein the pixel electrode directly contacts the drain electrode.

10. The array substrate according to claim 1, wherein the data line includes first and second data lines, and wherein the first and second shielding electrodes completely overlap the first and second data lines between the first and second common lines, respectively.

11. The array substrate according to claim 1, wherein the data line includes first and second data lines, and the first and second shielding electrodes partially overlap the first and second data lines between the first and second common lines, respectively.

12. A method of fabricating an array substrate for an in-plane switching mode liquid crystal display device, comprising:
    forming a gate line and a gate electrode on a substrate, the gate electrode connected to the gate line;
    forming a gate insulating layer on the gate line and the gate electrode;
    forming a semiconductor layer on the gate insulating layer over the gate electrode;
    forming a source electrode, a drain electrode and a data line, the source and drain electrodes spaced apart from each other and formed on the semiconductor layer, the data line crossing the gate line to define a pixel region;
    forming a pixel electrode in the pixel region, the pixel electrode connected to the drain electrode; and
    forming first and second common lines parallel to the gate line, a plurality of common electrodes over the pixel electrode and a shielding electrode over the data line, the shielding electrode including first and second shielding electrodes overlapping opposite side portions of the data line,
    wherein the first and second shielding electrodes overlap the data line along the data line continuously between the first and second common lines, and
    wherein the first and second common lines parallel to the gate line are spaced apart from the gate line.

13. The method according to claim 12, further comprising:
    forming a first passivation layer on the source electrode, the drain electrode and the data line; and
    forming a second passivation layer on the pixel electrode.

* * * * *